US012539143B2

United States Patent
House et al.

(10) Patent No.: US 12,539,143 B2
(45) Date of Patent: Feb. 3, 2026

(54) CERVICAL SUPPORT SYSTEM AND METHOD OF USE

(71) Applicants: Tufts Medical Center, Inc., Boston, MA (US); Cx Therapeutics, Inc., Lexington, MA (US)

(72) Inventors: Michael House, Lexington, MA (US); Errol Norwitz, Newton, MA (US); Dwayne E. Hickman, Jr., Berkeley, CA (US); Christopher Mccaslin, Portland, OR (US); Christopher O. Evans, Amherst, NH (US); Genevieve R. K. Laing, San Francisco, CA (US); Devon C. Campbell, Lexington, MA (US)

(73) Assignees: Tufts Medical Center, Inc., Boston, MA (US); Cx Therapeutics, Inc., Lexington, MA (US)

( * ) Notice: Subject to any disclaimer, the term of this patent is extended or adjusted under 35 U.S.C. 154(b) by 332 days.

(21) Appl. No.: 18/024,795

(22) PCT Filed: Sep. 7, 2021

(86) PCT No.: PCT/US2021/049209
§ 371 (c)(1),
(2) Date: Mar. 6, 2023

(87) PCT Pub. No.: WO2022/055838
PCT Pub. Date: Mar. 17, 2022

(65) Prior Publication Data
US 2023/0310031 A1    Oct. 5, 2023

Related U.S. Application Data

(60) Provisional application No. 63/075,467, filed on Sep. 8, 2020.

(51) Int. Cl.
*A61B 17/42* (2006.01)
*A61B 17/04* (2006.01)

(52) U.S. Cl.
CPC .......... *A61B 17/42* (2013.01); *A61B 17/0487* (2013.01); *A61B 2017/4225* (2013.01)

(58) Field of Classification Search
CPC .......... A61B 17/42; A61B 2017/00269; A61B 2017/0404; A61B 2017/048;
(Continued)

(56) References Cited

U.S. PATENT DOCUMENTS 5,807,281 A    9/1998  Welch
6,110,100 A *  8/2000  Talpade .............. A61M 60/515
                                             600/374

(Continued)

FOREIGN PATENT DOCUMENTS

WO      2019244159 A1    12/2019
WO   WO 2019/244159  *  12/2019

OTHER PUBLICATIONS

International Search Report and Written Opinion, PCT Application No. PCT/US2021/049209, mailed Dec. 8, 2021 (14 pages).

*Primary Examiner* — Elizabeth Houston
*Assistant Examiner* — Lindsey Bachman
(74) *Attorney, Agent, or Firm* — Mintz Levin Cohn Ferris Glovsky and Popeo, P.C.

(57) ABSTRACT

An apparatus for use in a cerclage procedure includes a flexible support member and a plurality of compression members disposed along the flexible support member. Each of the compression members has a connecting feature through which a suture used during the cerclage procedure is passed. Each of the compression members transforms a radially-compressive force applied by the suture into a radial pressure applied against the cervix.

8 Claims, 11 Drawing Sheets

(58) Field of Classification Search
CPC .... A61B 2017/0496; A61B 2017/1142; A61B 2017/4225; A61B 17/0487; A61B 17/12009; A61B 17/12013; A61B 17/1227; A61B 17/4216; A61B 2017/00827; A61B 2017/0406; A61B 2017/0414; A61B 2017/12018; A61B 2017/4216; A61F 5/0083; A61F 6/08; A61F 2/0036; A61F 2/2481; A61F 5/0076; A61F 6/146; A61F 6/202
See application file for complete search history.

(56) References Cited

U.S. PATENT DOCUMENTS

| | | | | |
|---|---|---|---|---|
| 2001/0016675 A1* | 8/2001 | Mortier | ............... | A61F 2/2481 600/16 |
| 2003/0233022 A1* | 12/2003 | Vidlund | ........... | A61B 17/00234 600/16 |
| 2004/0089308 A1 | 5/2004 | Welch | | |
| 2012/0065654 A1* | 3/2012 | Straehnz | ........... | A61B 17/12013 606/157 |
| 2021/0022746 A1* | 1/2021 | Smith | ................ | A61B 17/1285 |
| 2021/0236170 A1* | 8/2021 | Shashar | ........... | A61B 17/12009 |
| 2022/0054170 A1* | 2/2022 | Cedars | ............... | A61B 17/0483 |

* cited by examiner

CERVICAL SUPPORT SYSTEM AND METHOD OF USE

CROSS-REFERENCE TO RELATED APPLICATIONS

This application is a 371 national stage of International Application No. PCT/US2021/049209, filed Sep. 7, 2021, which claims the benefit of U.S. Provisional Patent Application No. 63/075,467, filed on Sep. 8, 2020, and entitled "Cervical Support System and Method Of Use," the entireties of which are herein incorporated by reference.

BACKGROUND

Embodiments of the present disclosure relate to supporting the cervix.

Cervical insufficiency is a known complication of pregnancy that can cause miscarriage or preterm birth. Preterm birth is a frequent cause of morbidity and mortality in newborn infants and is the leading cause of death in childhood. Complications from preterm birth include chronic lung disease, feeding difficulties, retinopathy and neurodevelopmental abnormalities. The rate of preterm birth in the United States in 2015 was 9.6% and a 2006 report from the Institute of Medicine estimated the cost per preterm newborn in the United States was $51,600, which translates to $26.2 billion in annual health care costs.

In cases of cervical insufficiency, the cervix dilates in the absence of labor, which leads to preterm delivery. Cervical insufficiency is currently treated using a cerclage procedure in which a suture is placed around the cervix to provide support and prevent preterm dilation. Cerclage procedures are performed in 0.3% to 0.4% of pregnancies, which translates to 15,000 annual procedures in the United States.

SUMMARY

In a typical cerclage procedure, the cerclage is removed 1) at 37 weeks, 2) for preterm labor or 3) for preterm premature rupture of the membranes. In some cases, it can be difficult to visualize the suture below the level of the knot. When a patient presents with labor, the knot can be buried in the tissue. When the suture is difficult to visualize, clinicians can inadvertently cut the knot, which makes it nearly impossible to visualize the suture. There are cases when the patient labors with a cerclage in place, which leads to cervical laceration. Accordingly, there is an ongoing need for improved systems and methods for cerclage procedures.

As discussed in greater detail below, use of a knot tube provides a fastening that is more easily identifiable and locatable, for example, when the suture is to be removed, as compared to a suture fastening knot that can be buried in the tissue. If a buried knot is eliminated, the suture will be easier to cut which, minimizes the risk of laceration of patient tissue. In embodiments, in which the knot tube includes barbs or other structure for preventing the suture from passing back through the inner passage, the knot tube allows for easier tightening of the suture.

In an embodiment, an apparatus comprises a body configured for use in a cerclage procedure, the body including an outer surface formed of a biocompatible material and an inner surface, the inner surface defining an inner passage having a longitudinal axis and a first dimension extending from a first end to a second end of the body, the inner passage configured to allow suture to extend therethrough.

In another embodiment, a kit for use in a cerclage procedure comprises a suture, a body, and compression tubes. The body includes an outer surface formed of a biocompatible material and an inner surface, the inner surface defining an inner passage having a longitudinal axis and a first dimension extending from a first end to a second end of the body, the inner passage configured to allow suture to extend therethrough. Each compression tube is formed of a biocompatible material and has an inner surface, the inner surface defining an inner passage having a longitudinal axis and a third dimension extending from a third end to a fourth end of the compression tube, the inner passage being configured to allow suture to extend therethrough.

Embodiments which include compression tubes have additional advantages. For example, cervical insufficiency can be caused by abnormally soft cervical tissue. In some cases, the soft tissue of the cervix does not maintain the position of the suture in the tissue and the suture pulls through the cervix. Over time, the cerclage is displaced and does not enclose the cervical canal. If the cerclage does not enclose the canal, it does not provide support to the cervix.

Suture migration can occur because compression from the cerclage is concentrated over a small surface area. Concentrated compression over a small area leads to tissue disruption (i.e., the soft cervical tissue is unable to resist the compression force of the cerclage). When tissue disruption occurs, the cerclage tears the tissue. Use of compression tubes minimizes possible suture migration and alleviates excess stress from the suture on the wound. In particular, the compression tubes spread the compression support over a wider surface area, which alleviates excess compression and prevents suture migration. Furthermore, lower risk of suture migration will lead to decreased risk of laceration.

In yet another embodiment, a method for providing support to a cervix comprises forming bights by stitching a suture along the circumference of the cervix, the suture having a first end and a second end, providing a device (e.g., a knot tube) at the ends of the suture, the device including an outer surface formed of a biocompatible material and an inner surface, the inner surface defining an inner passage having a longitudinal axis and a first dimension extending from a first end to a second end of the body, the inner passage configured to allow the suture to extend therethrough, and providing a knot with a first end and a second end of the suture.

By using this method for providing support to a cervix, bights are formed by stitching suture along the circumference of the cervix such that the anterior suture level is at the cervico-vesico fold, and the posterior suture level is at the roof of the posterior fornix, the suture having a first end and a second end. In embodiments in which the device is a knot tube, the knot tube serves a similar function as a surgical knot in a suture but with additional advantages. For example, identification and location of the end of the suture is further facilitated. That is, the tie member provides a location where the end of the suture can be tied-off rather than allowing the end to be looser requiring the clinician to cut the loose end.

In another embodiment, a cervical-support system is provided for use in a cerclage procedure. The cervical-support system includes a flexible support member and plates disposed along the flexible support member. Each of the plates includes a passage through which a suture used during the cerclage procedure is passed. The plate transforms a radially-compressive force applied by the suture into a radial pressure applied against the cervix.

Embodiments include those in which the flexible support member is integral with the plates and those in which the flexible support member is a separate structure that engages a mating feature in each of the plates.

Also, among the embodiments are those in which the flexible support member is elastomeric.

Also, among the embodiments are those in which pairs of plates are separated by an angle that is equal to an integer multiple of the circumference of a unit circle divided by the number of plates and those in which the plates comprise a first plate and a second plate that are separated by an angle that differs from an integer multiple of the circumference of a unit circle divided by the number of plates.

In some embodiments, the plate comprises a passage for accommodating a suture. This passage extends between openings on the plate's side faces.

Other embodiments include those in which the plate comprises a groove that extends across the plate's top face. This groove opens into a passage that extends across the plate.

In still other embodiments, the plate has two enlarged ends separated by a neck. The enlarged ends are disposed opposite each other. Among these embodiments are those in which the plate comprises first and second passages that extend across the first and second enlarged ends, respectively.

In another aspect, the invention features a method that includes providing cervical support by encircling a cervix with a flexible support member that holds plates, causing each of the plates to engage a suture, and causing the suture to apply a radially-inward force against the plates, thereby causing the plates to apply a radially-inward pressure to support the cervix.

In another aspect, the invention features a pressure transformer that, during a cerclage procedure, is disposed to contact a cervix along a transformer contact-area and to receive a radially-inward force applied by a suture having a suture contact-area that is less than the transformer contact-area. The pressure transformer exerts compressive pressure on the cervix at the first contact area.

In some embodiments, the pressure transformer comprises an elastic sleeve. In such embodiments, the transformer contact-area comprises that area at which, when the elastic sleeve is installed on the cervix, the elastic sleeve contacts the cervix. Among these embodiments are those in which the elastic sleeve comprises upper and lower sleeve-portions.

In other embodiments, the pressure transformer comprises a lattice. In such embodiments, the transformer contact-area comprises those areas of the lattice that contact the cervix when the pressure transformer has been installed on a cervix. Among these are embodiments the lattice includes comprising upper and lower rings and stiffeners extending between the rings.

In other embodiments, the pressure transformer comprises plates. In such embodiments, the transformer contact-area comprises those areas of the plates that contact the cervix when the pressure transformer has been installed on a cervix.

In another embodiment, an implantable occlusion device is provided and comprises a flexible support member configured to encircle a physiological structure. The device also includes at least one compressive member disposed on the support member such that the at least one compressive member is configured to distribute a radially compressive force applied by the support member across the physiological structure.

Other features and advantages of the disclosed embodiments are apparent from the following description, figures, and from the claims.

It is noted that the drawings are not necessarily to scale. The drawings are intended to depict only typical aspects of the subject matter disclosed herein, and therefore should not be considered as limiting the scope of the disclosure.

DETAILED DESCRIPTION

In various embodiments, systems and corresponding methods for addressing cervical insufficiency are provided herein. As discussed in detail below, premature cervical dilation can be inhibited and/or prevented by distributing occlusive forces across the cervix with reduced incidence of damage to the cervix. A flexible member (e.g., a suture and/or band) can be utilized that has one or more compressive members disposed thereon. Compressive forces generated upon tightening the flexible member around the cervix applies force to the compressive members, which in turn apply force to the cervix. In this way, locally concentrated forces can be reduced and/or substantially avoided, enabling a compressive force to be applied to the cervix with a substantially uniform force profile.

Figure 1:
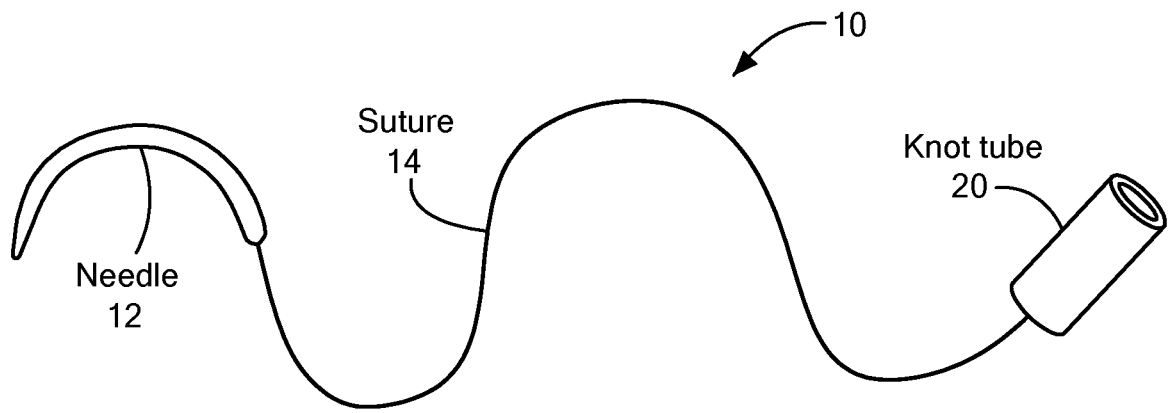
FIG. 1 illustrates a knot tube, suture, and suture needle for supporting a cervix.

Referring to FIG. 1, one exemplary embodiment of a cervical support system 10 is illustrated. As shown, the cervical support system 10 includes a suture needle 12, a suture 14 (e.g., a non-absorbable suture) and a knot tube 20. Embodiments of the suture needle 12 and the suture 14 can adopt a variety of forms. As shown, the suture needle 12 is in the form of a circle suture needle and the suture is made of a monofilament material (e.g., polypropylene). In other embodiments, the suture can be in the form of braided nylon tape (e.g., MERSILENE® through the cervical tissue, 5 mm tape). In other embodiments, other needle types that could be used in place of suture needle 12.

Figure 2:
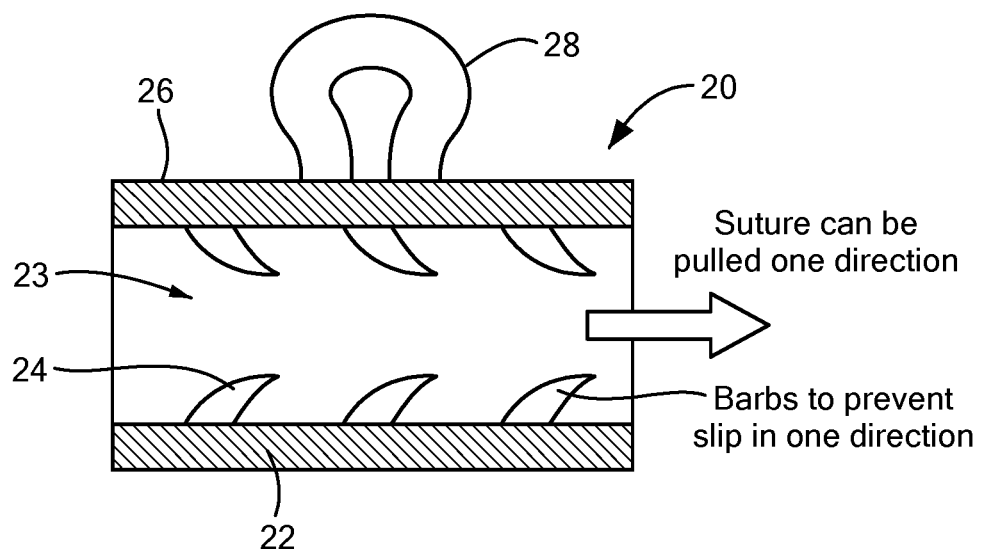
FIG. 2 is a cross-sectional view of the knot tube having barb members.

Referring to FIG. 2, an embodiment of the knot tube 20 is illustrated in greater detail. As shown, the knot tube 20 is in the form of a hollow cylindrical tube 22 having an inner passage 23. The materials, manufacturing techniques, and dimensions of the knot tube 20 can be selected as necessary to satisfy the requirements of specific deployments. As an example, the knot tube 20 can be formed of a flexible biocompatible polymer (e.g., silicone). In alternative embodiments, the knot tube can be formed from polyurethane and polyethylene. Manufacturing techniques can include, but are not limited to, extrusion, injection molding and 3D printing. In one embodiment, the length of knot tube 20 is about 15 mm±5 mm, the outer diameter is about 8 mm±5 mm, and the inner diameter is about 5 mm±3 mm.

Embodiments of the knot tube 20 can also include one or more additional features, alone or in combination. In one aspect, teeth-like barbs 24 can be positioned along the surface of the inner passage 23. In this manner, when suture 14 is passed through inner passage 22 in one direction, it is prevented from being passed or pulled back through the inner passage in the opposite direction. In another aspect, the knot tube 20 can include on its outer surface 26, a tie member 28. The function and purpose of tie member 28 will be described in greater detail below in conjunction with FIG. 4.

Figure 3:
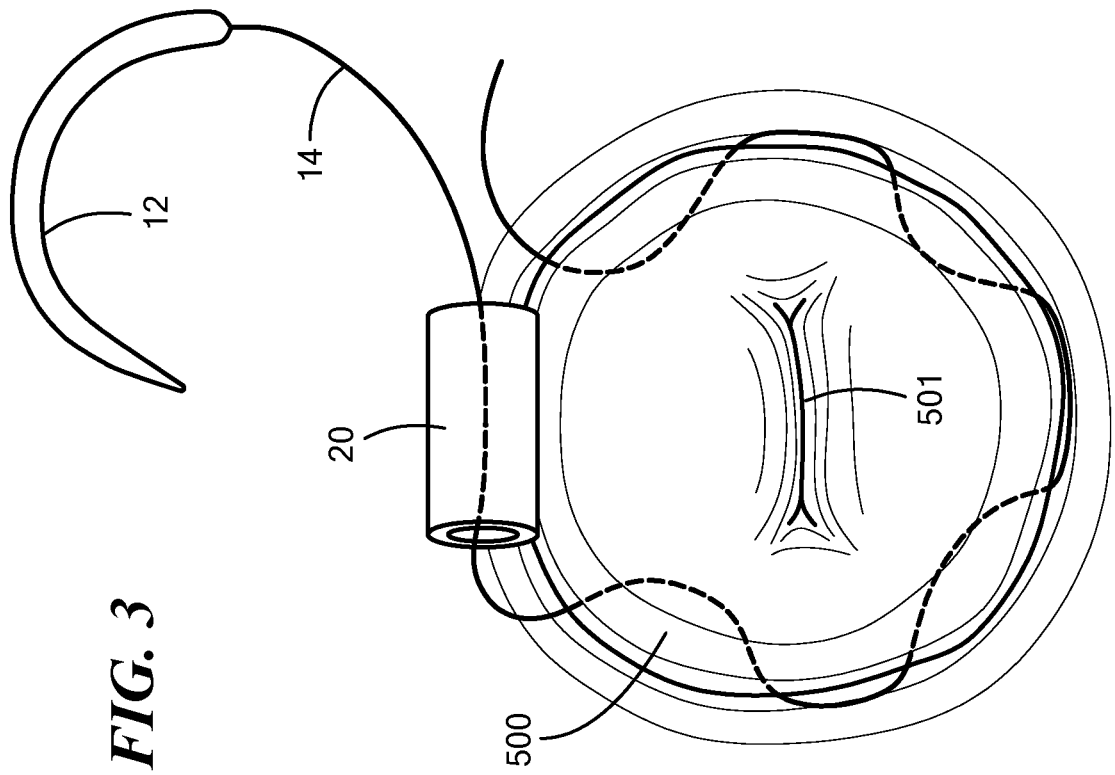
FIG. 3 illustrates use of the knot tube, suture, and suture needle for supporting the cervix.

Referring to FIG. 3, the procedure for using knot tube 20 will be described. Using the suture 14 (e.g., polyester braid), a purse-string suture is placed around the cervix 500 with a suitable number of passes (e.g., 4-6 passes). For example, the suture needle 12 is inserted through the tissue of the upper part of the cervix at an entry point. The suture needle 12, and therefore the suture 14, should pass through the cervical tissue at an approximately uniform depth. The suture 14 is passed as a running stitch in and out along the edge of the cervical tissue surrounding the canal in such a way that when the ends of the suture 14 is drawn tight, the opening of the cervical canal is closed like a purse. Passage of the suture needle 12 can follow the surgical technique of a McDonald cerclage procedure. Care is taken to avoid the cervical canal 501. After traveling around the cervix in purse-string fashion, the suture 14 is passed through knot tube 20 and drawn sufficiently tight to provide sufficient support to the cervix. The suture needle 12 is then removed.

The suture needle 12 could be removed before passing through knot tube 20 or the suture needle 12 could be removed after passing through the knot tube 20. Alternatively, one end of the suture 14 can be locked in the knot tube 20, then the other end of the suture 14 has suture needle 12 and when done, the suture needle 12 is removed and the suture end is tied to a tie-element 28.

Figure 4:
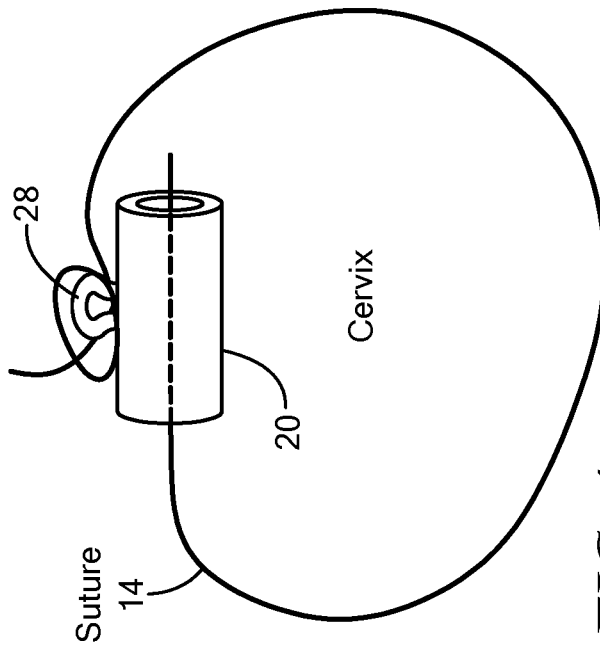
FIG. 4 illustrates use of the tie member.

Referring to FIG. 4, in certain embodiments, the tie-element 28 of knot tube 20 is used to secure an end of the suture 14. Tension on the suture 14 can be made to be adjustable. For example, should support of the cervix be deemed insufficient, (e.g. cervical shortening despite the presence of the cerclage), the knot tube 20 will allow tightening of the suture to provide increased support. After the ends of the suture 14 are fastened to the knot tube 20, one end of the suture needs a degree of freedom such that it can apply increased compression to the cervix over time, should that be desired. The end of the suture with a degree of freedom could be the end closest to the suture needle 12 or it could be the end furthest from the suture needle 12.

Figure 5:
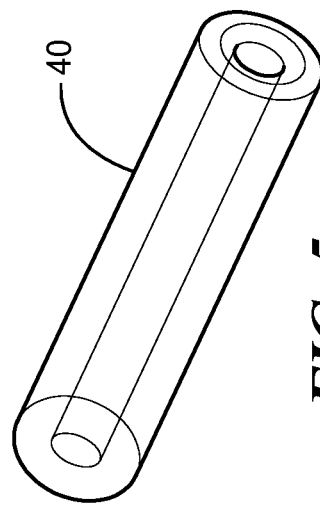
FIG. 5 shows a compression tube for use with a knot tube.
Figure 6:
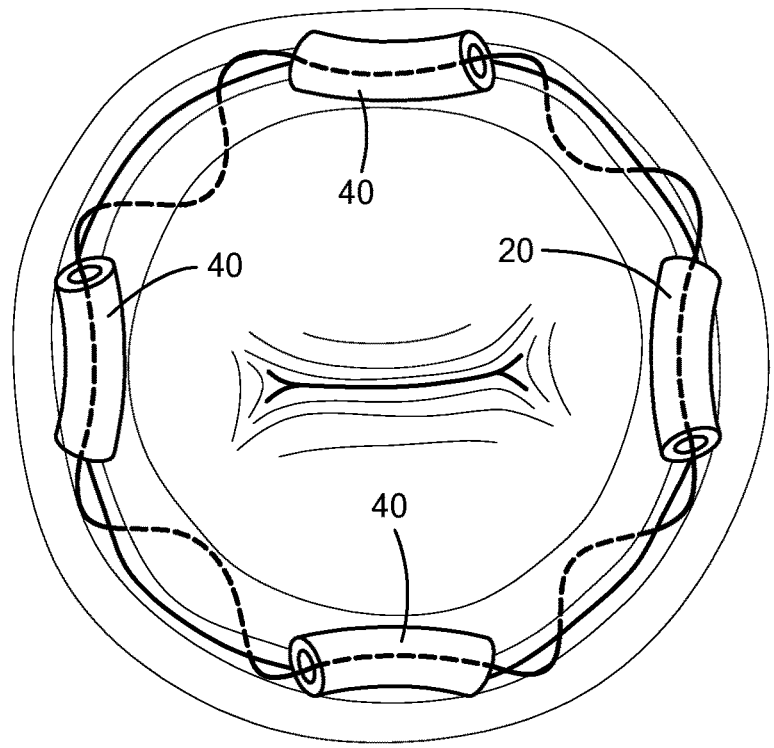
FIG. 6 illustrates a knot tube, suture, suture needle, and compression tubes used in supporting a cervix.

Referring to FIGS. 5 and 6, in certain embodiments, one or more compression tubes 40 can be used with the cervical support system 10. The compression tubes 40 are hollow and made of a flexible, biocompatible polymer (e.g., silicone, polyurethane, polyethylene, etc.) As shown, a plurality of compression tubes are employed. After each insertion of suture needle 12 through the cervical tissue, the suture needle 12 and the suture 14 can be passed through a respective compression tube 40. The suture needle 12 is then passed again through the cervical tissue with another compression tube extended over the suture 14.

The number of compression tubes 40 employed can be varied. As shown, a series of compression tubes 40 is associated with each bight. However, in alternative embodiments, compression tubes can be associated with a fraction of the bights (e.g., every other bight) of the purse-string suture.

The length of the compression tubes 40 can be varied as necessary to satisfy the requirements of specific deployments. In one embodiment, the length of compression tubes 40 is about 15 mm±5 mm, the outer diameter is about 8 mm±5 mm, and the inner diameter is about 5 mm±3 mm. Compression tubes 40 can be fabricated using any number of manufacturing practices including extrusion, injection molding and 3D printing.

With this arrangement, each compression tube 40 is positioned against the cervical tissue to provide cervical support. When the purse string is completed, the suture needle 12 is removed and the end of suture 14 is placed into the knot tube 20 and drawn tight. As described above, the suture 14 is securely fastened because knot tube prevents the suture from slipping back in the direction opposite to the threading direction. If the knot tube 20 is preloaded with the suture 14 then one end of the knot tube 20 is sutured in place, the compression tubes 40 are sutured in place, the suture 14 is secured to the tie member 28 and the suture 14 is tightened.

Based on clinical observations, suture migration generally occurs in a direction toward the knot. Knot tube 20 and compression tubes 40 resist the forces acting to cause suture migration because knot tube 20 and compression tubes 40 have a larger surface area contacting the cervical tissue.

In alternative embodiments, knot tube 20 and compression tubes 40 are impregnated or coated with medication (e.g., progesterone) that could be slow-released to augment the therapeutic response. For example, patients with cervical shortening and no history of preterm birth are often treated with vaginal progesterone. In some of these patients, further cervical shortening can occur. If progesterone is released from the cervical support system, then both mechanical support and medical treatment are combined in a single system.

Figure 7:
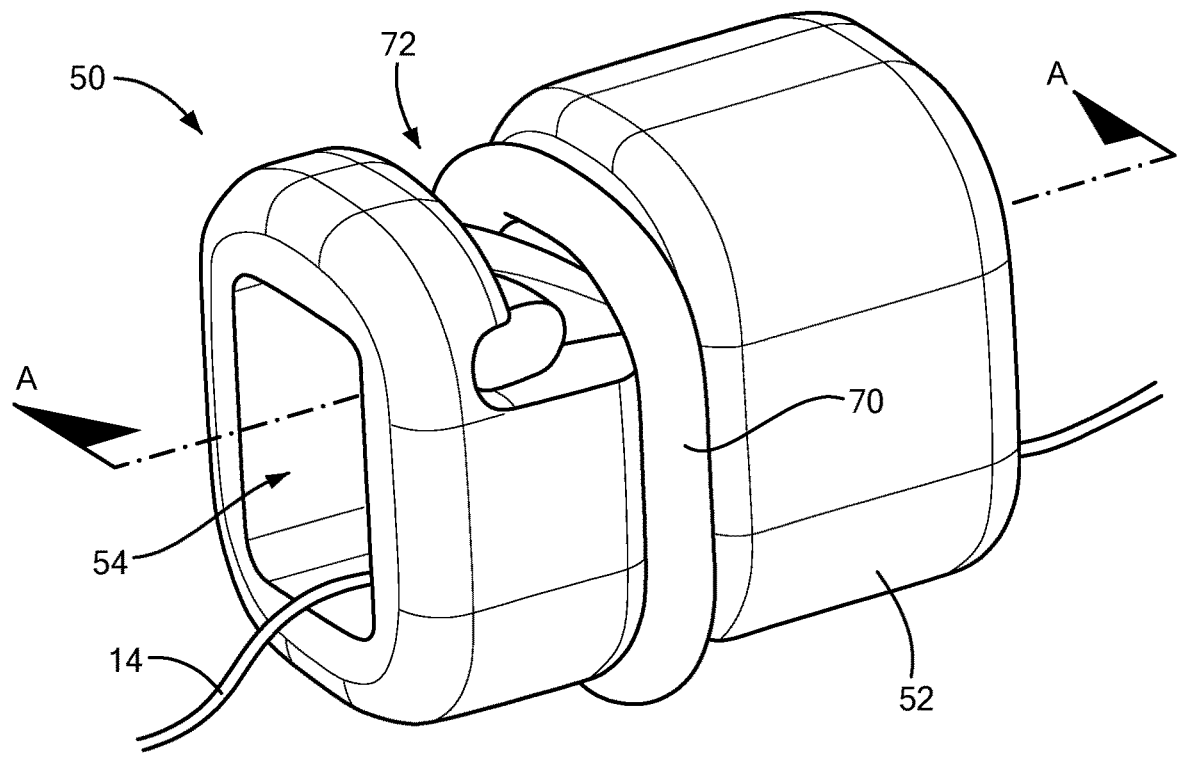
FIG. 7 is an alternative embodiment of a knot tube.
Figure 8:
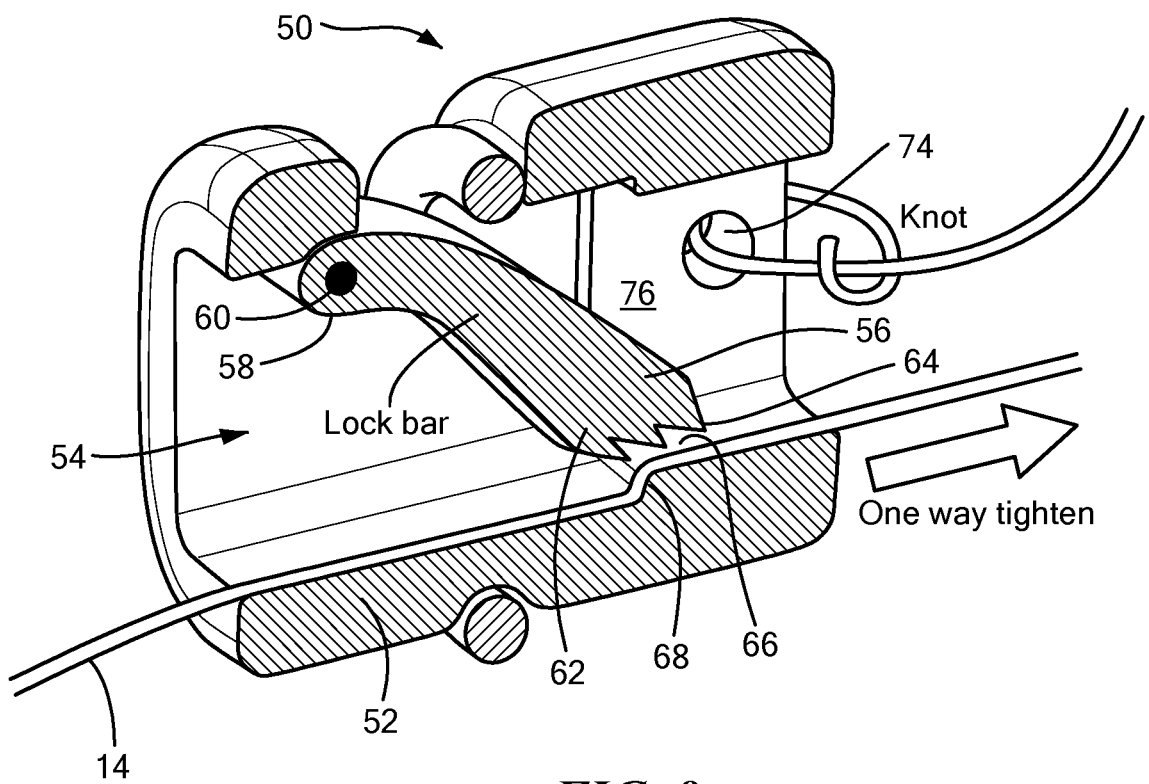
FIG. 8 is a cross-sectional side view of the knot tube along lines A-A of FIG. 7.

Referring to FIGS. 7 and 8, an alternative version of a knot tube 50 is illustrated. As shown, the knot tube 50 includes a housing 52 having an inner passage 54 within which a pivotable lock arm 56 is positioned. The lock arm 56 has a first end 58 attached to an inner wall of the inner passage 54 at a pivot point 60 and an opposite, second end 62 having teeth 64. Teeth 64 engage with a contact surface 66 on the inner wall of inner passage 54 and through which the suture 14 can be secured. In this embodiment, the contact surface 66 is defined by a step 68 that engages with teeth 64.

In operation, after the suture 14 is placed around the cervix (e.g., using a purse-string suture arrangement), it is passed through the inner passage 54 and pulled tight between the teeth 64 and the step 68. An elastomeric band 70 is then placed around the outer periphery of housing 52 to secure the lock arm 56 so that the suture 14 is secured into place. The housing 52 includes a channel 72 to retain elastomeric band 70 and minimize the profile of housing 52.

In an alternative mode of operation, the knot tube 50 is pre-loaded on the suture 14. The elastomeric band 70 would also be preloaded. After the suture 14 is placed around the cervix in a purse-string fashion, the suture needle 12 is removed and the knot is tied to the tie member 28, and the preloaded suture 14 in the knot tube 50 is tightened.

It can be appreciated that the ability to loosen the suture 14 and/or retighten the suture 14 can be desirable to allow for adjustments. Thus, to provide for suture adjustment, the elastomeric band 70 can be removed and lock arm 56 pivoted away from step 68 to allow the suture to be released. Once the suture 14 is adjusted, the lock arm 56 can be pivoted towards step 68.

Housing 52 also includes a hole 74 on a broad, side surface 76 through which the suture 14 can be passed and tied-off.

Figure 9:
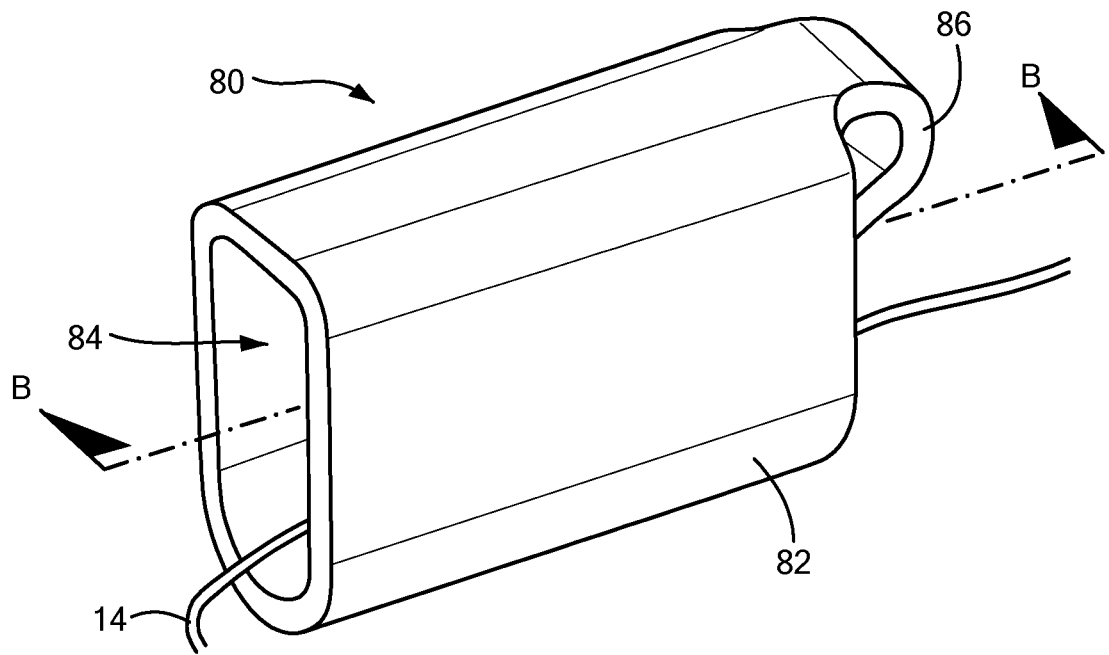
FIG. 9 is another alternative embodiment of a knot tube.
Figure 10:
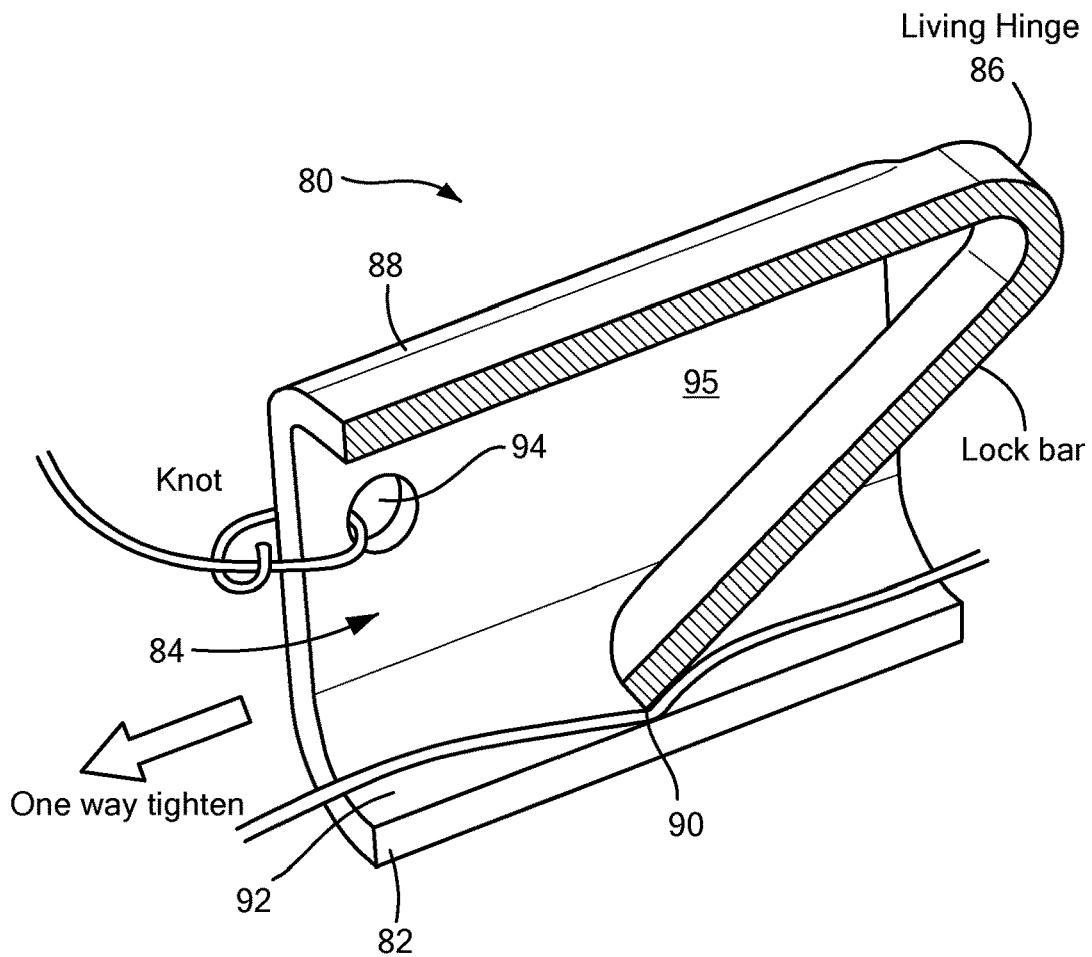
FIG. 10 is a cross-sectional side view of the knot tube along lines B-B of FIG. 9.

Referring to FIGS. 9 and 10, another alternative version of a knot tube 80 is provided. As shown, the knot tube 80 includes a housing 82 having an inner passage 84 within which a living hinge 86 is positioned. The living hinge 86 extends from a wall 88 (e.g., an upper wall) of the housing 82 and into an inner passage 84 where it terminates at a distal end 90. The distal end 90 engages a contact surface 92 on the inner wall of inner passage 84 where the suture 14 passes therebetween and is secured. The living hinge 86 can be formed of the same material as the two rigid pieces to which it connects and will be thinned to allow rigid pieces to bend along the line of the living hinge 86.

In operation, after the suture 14 is placed around the cervix (e.g., using a purse-string suture arrangement), it is passed through the inner passage 84 and pulled tight between distal end 90 and contact surface 92. To release the suture 14 (e.g., retightening or removal of suture), the distal end 90 of the living hinge 86 is pushed further into the inner passage 84 so that suture 14 is no longer pinched between the distal end 90 and the contact surface 92.

The housing 82 can also include a hole 94 on a broad, side surface 96 through which the suture 14 can be passed and tied-off.

Figure 11:
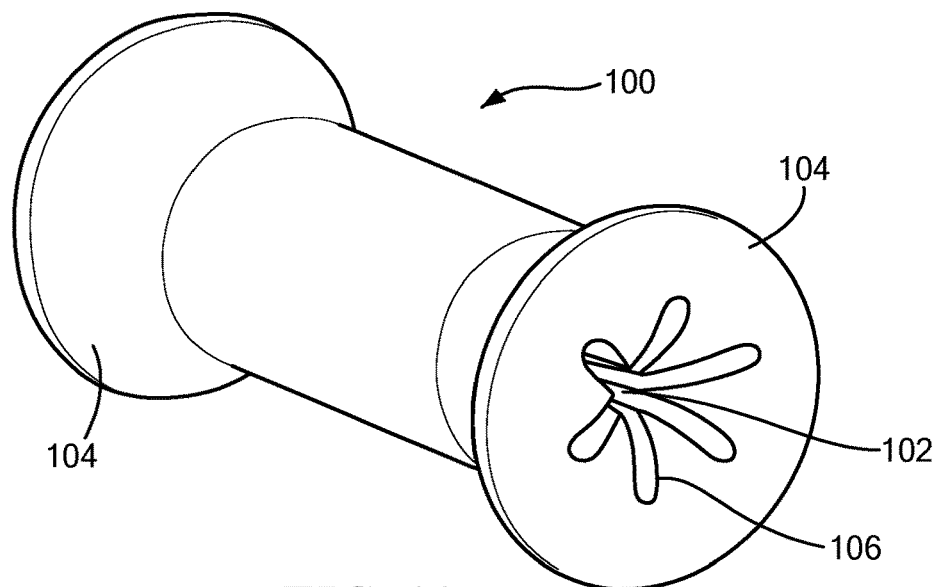
FIG. 11 is an alternative embodiment of a compression tube.

Referring to FIG. 11, an alternative embodiment of a compression tube 100 is illustrated. As shown, the compression tube 100 includes an inner passage 102 and opposed flanged ends 104 which have an outer diameter larger than an outer diameter of an intervening central region of the compression tube 100. With this configuration, the compression tube 100 is bobbin-shaped. Openings of the inner passage 102 include radially extending channels 106 for facilitating insertion of the suture 14 into the compression tube 100 and, in use, for grasping the suture 14 to minimize sliding of the suture 14. The flanged ends 104 have two purposes. First, it will be easier to 'thread the needle' by providing a bigger target. Second, the shape conforms to the cylindrical shape of the cervix. For example, a stiffer material that does not bend as easily may be preferable. If the compression tube is curved, or flanged, it will distribute forces better.

Figure 12:
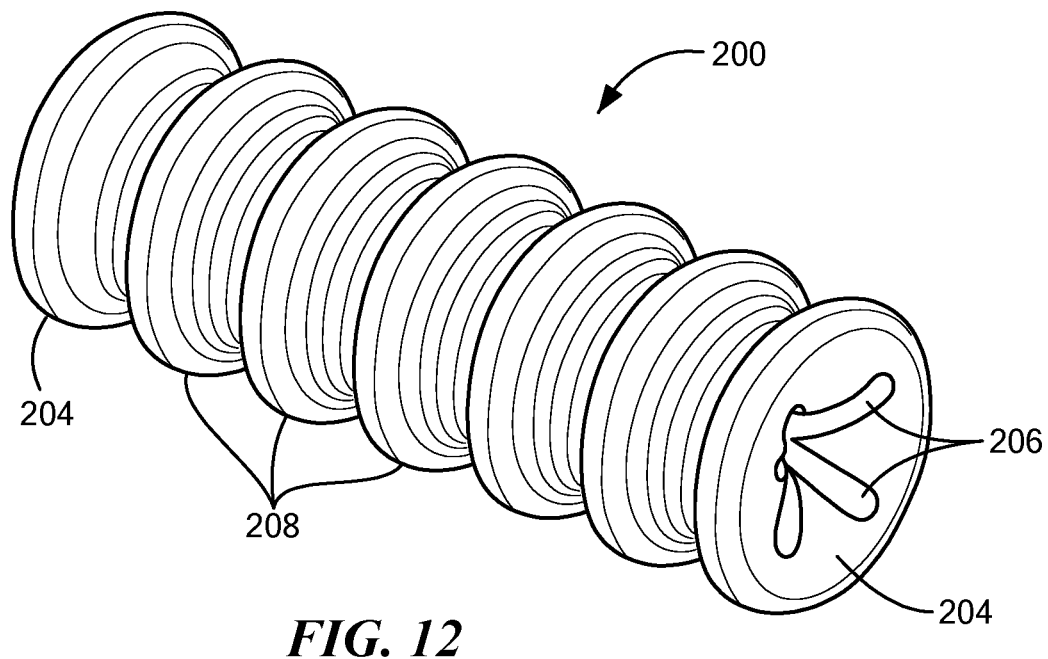
FIG. 12 is another alternative embodiment of a compression tube.

Referring to FIG. 12, another alternative embodiment of a compression tube 200 is illustrated. As shown, the compression tube 200 includes an inner passage 202 having ends 204 with radially extending channels 206 for facilitating insertion of the suture 14 into the compression tube 200. The outer surface of compression tube 200 further includes annular segments 208. Similar to the embodiment shown in FIG. 11, in use the annular segments 208 also provides better grasping of the suture 14 to minimize sliding of the suture 14.

Figure 13:
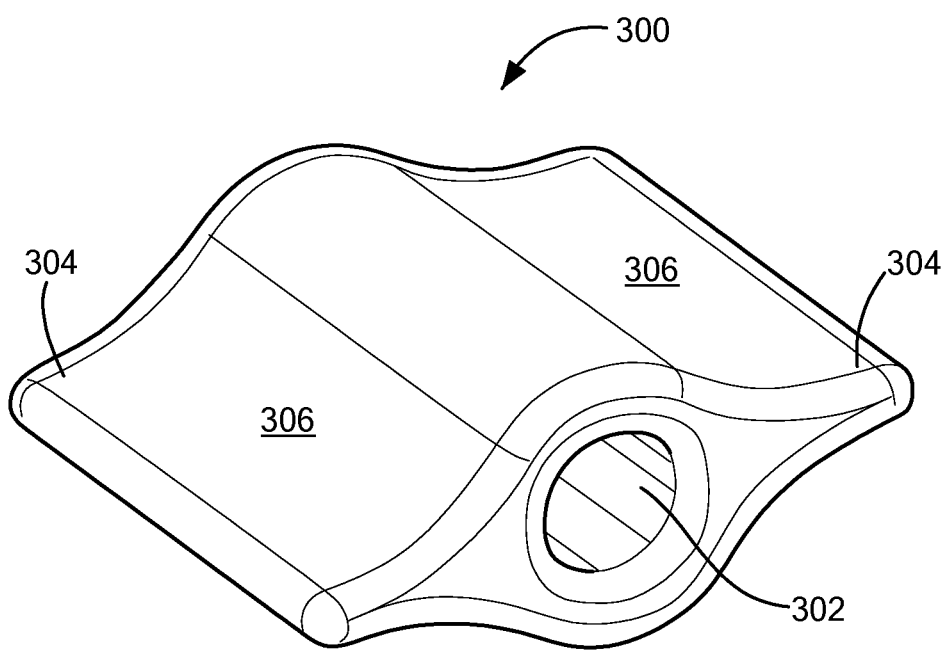
FIG. 13 is still another alternative embodiment of a compression tube.

Referring to FIG. 13, yet another alternative embodiment of a compression tube 300 is illustrated. As shown, the compression tube 300 includes an inner passage 302 and winged extensions 304 with curved surfaces 306. The curved surfaces 306, in use, promote better gripping of the cervical tissue it contacts.

Figure 14:
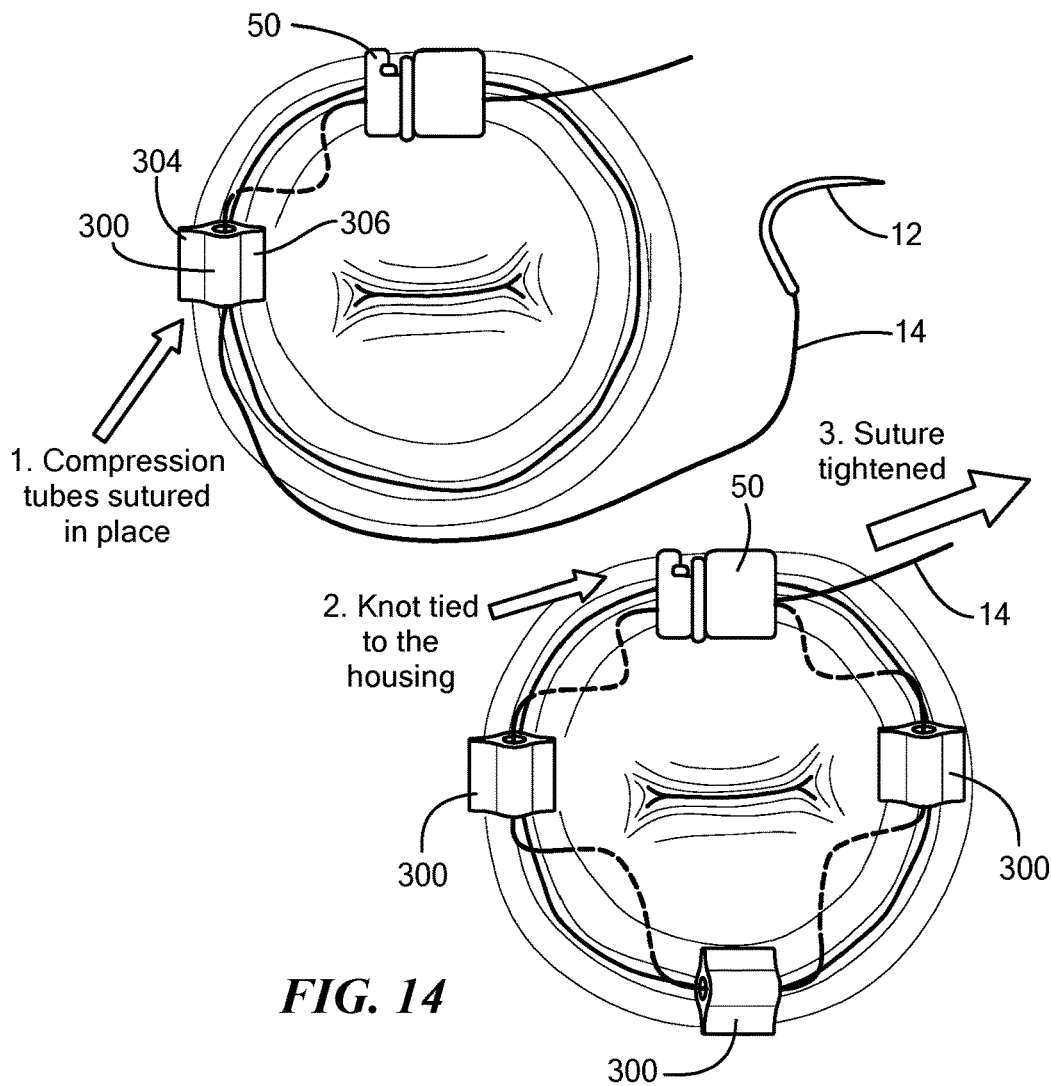
FIG. 14 illustrates use of the knot tube of FIG. 7, suture, suture needle, and compression tube of FIG. 13 used in supporting a cervix.

Referring to FIG. 14, after each insertion of suture needle 12 through the cervical tissue, the suture needle 12 and the suture 14 are passed through one of the compression tubes 300. The suture needle 12 is then passed again through the cervical tissue with another compression tube 300 extended over the suture 14. Thus, a series of compression tubes 300 is associated with each bight of the purse-string suture. With this arrangement, each compression tube 300 is positioned such that curved surfaces 306 of winged extensions 304 are seated against the cervical tissue to provide cervical support. When the purse string is completed, suture needle 12 is removed and the end of the suture 14 is placed into a knot tube (here, knot tube 50) and drawn tight. As described above, suture 14 is securely fastened because knot tube prevents the suture from slipping back in the direction opposite to the threading direction.

Figure 15:
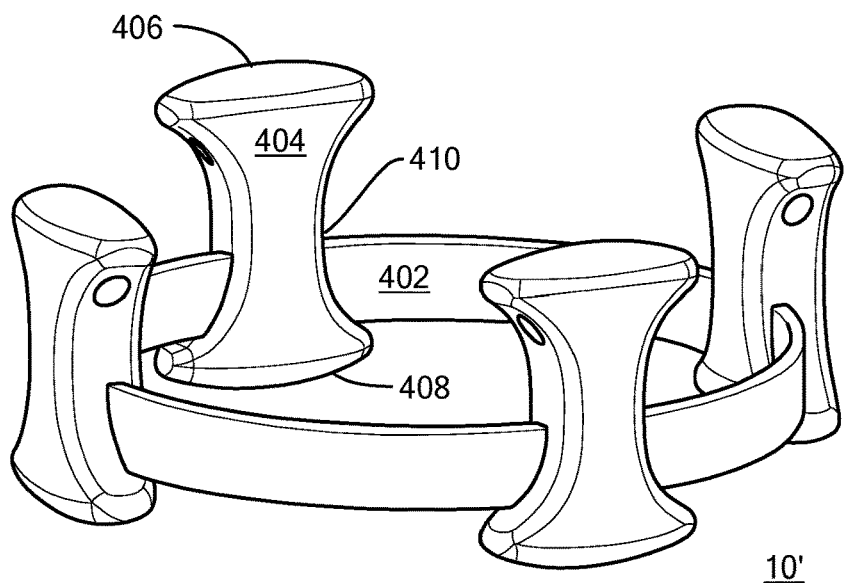
FIG. 15 shows a cervix-support system that relies on a ring of plates.

FIG. 15 shows an alternative cervical-support system 10' that includes a flexible support member or support band 402 having one or more compression members 404 attached thereto. The flexible support member 402 can be configured to extend about the exterior of a physiological structure (e.g., the cervix). As an example, embodiments of the flexible support member can be formed from biocompatible materials that exhibit reversible deformation in use (e.g., elastomers).

Embodiments of the compression members 404 can be configured to distribute the radially compressive force applied by the flexible support member 402. That is, radially compressive force applied by the flexible support member 402 can be transformed into a radial pressure applied against the physiological structure. Accordingly, the compression members 404 can adopt a variety of configurations that include surfaces oriented towards the interior of the flexible support member 402 (e.g., radially inward towards for contact with a physiological structure encircled by the flexible support member 402) for distributing the compressive force. As shown, in FIGS. 15 and 16, the compression members 404 can be in the form of plates. However a person skilled in the art will appreciate that the compression members may adopt other geometric forms that are generally planar or curved, including but not limited to rods, cylinders, bars and beams.

The number and position of the one or more compression members 404 employed in the cervical-support system 10' can be varied, as necessary. In FIG. 15, four compression members 404 are illustrated. However, the cervical support system can have fewer than four compression members (e.g., three compression members) or more than four compression members (e.g., five, six or more compression members).

When two or more compression members 404 are present, they can be distributed along the circumference of the flexible support member 402 at approximately equal intervals or other selected intervals.

In an example, two or more compression members 404 can be present in the cervical-support system 10' and distributed at approximately equal intervals about the circumference of the flexible support member 402. Further assume that the one or more compression members 404 adopts a form having bilateral symmetry about axes that bisect the compression members 404 in perpendicular directions (e.g., vertical and horizontal axes). Each pair of adjacent plates 404 defines an angle in the radial direction about the center of the flexible support member 402. In a cervical-support system 10' having n compression members 404, the angle between the center lines (vertical bisector) of any two compression members 404 can be an integer multiple of $2\pi/n$ radians. Thus, for a configuration having four compression members 404, adjacent compression members 404 are angularly spaced around the circumference of the flexible support member 402 by 90°. In an embodiment with three compression members 404, the angular spacing between adjacent compression members 404 around the circumference of the 402 would be 120°.

Figure 16:
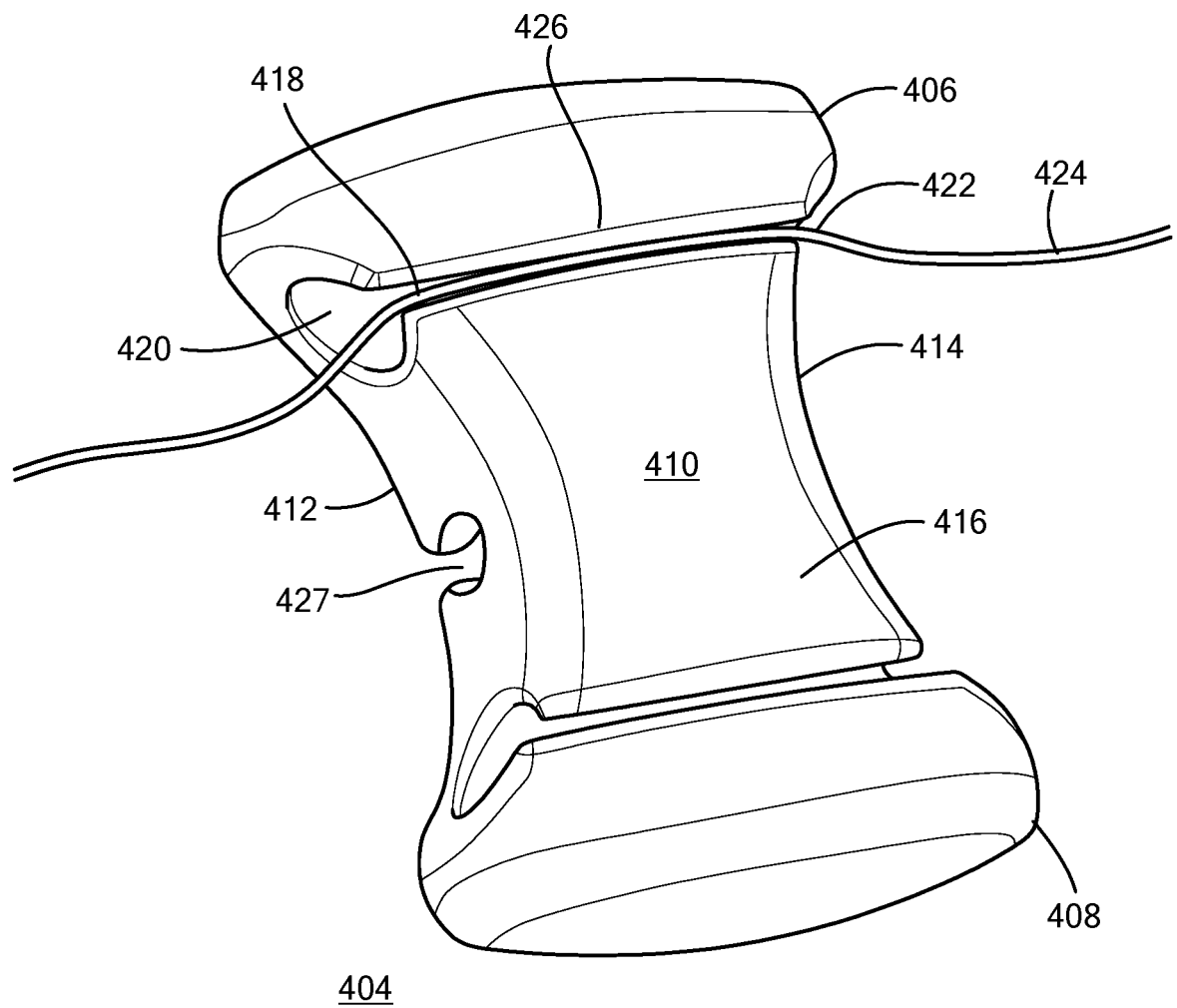
FIG. 16 shows a plate from the ring of plates shown in FIG. 15.

Referring now to FIG. 16, an embodiment of the compression member is illustrated in greater detail. As shown, the compression member 404 includes first and second ends 406, 408 that are separated by a neck 410 and opposed side faces 412, 414. The flexible support member 402 connects to the compression member 404 at the neck 410 so as to hold all the compression member 404 together in a closed geometric shape (e.g., a ring). So positioned, the side faces 412, 414 face in the circumferential direction while the opposed surfaces of the neck 410 face in the radial direction.

In one embodiment, shown in FIG. 15, the flexible support member 402 can extend through a channel formed through the width of the compression member 404. In another embodiment, shown in FIG. 16, the compression member 404 can include a mating feature 427 (e.g., a recess) formed in the neck 410 that is dimensioned to receive the flexible support member. The mating feature 427 can be formed in a surface of the neck 410 that faces radially outward from the center of the flexible support member 402. While the flexible support member 402 and at least one compressive member 404 are illustrated and described above as separate structures that are coupled together, a person skilled in the art will appreciate that one or more of the compression members may be integrally formed with the flexible support member.

The geometry of the radially facing surfaces of the neck 410 can adopt a variety of configurations. In an embodiment, at least one of the surfaces of the neck 410 can be curved (e.g., the surface facing radially inward). Such curvature can be convex or concave. In other embodiments, one or more of the surfaces of the neck can be generally planar. In further embodiments, one or more of the radially facing surfaces of the neck can include combinations of planar and curved regions.

In further embodiments, at least one connection feature 418 (e.g. a passage) can be formed in the compression member 404 that extends in the circumferential direction between the side faces 412, 414. The connecting feature 418 opens at corresponding openings 420, 422 in the respective side faces 418, 420. The connecting feature 418 can be dimensioned to receive the suture 14. In the illustrated embodiment of FIG. 16, the connecting feature 418 features a slit that opens into a groove 426. This slit and groove 426 configuration can simplify installation since the suture 424 can be snapped through the groove 426 and into the connecting feature 418. However, in other embodiments, connecting feature 218 is closed and the suture 424 is threaded through the openings 420, 422.

As further illustrated, two connecting features 418 are present, adjacent to each of the first and second ends 406, 408. The connecting features 418 are formed in the surface of the neck that faces radially inward. However, in alternative embodiments, greater or fewer connecting features can be present and the location of the connecting feature within the neck can be changed from that illustrated in FIG. 16.

In use, the suture 424 is engaged with each of the respective compression members 404 of the cervical-support system 10' by passing the suture 424 through their respective connecting features 418. When drawn tight, the suture 424 applies a radially-inward compressive force that provides cervical support. This distributes a radially-inward force exerted by the drawn suture 424 so as to reduce locally higher pressure exerted on certain regions of the physiological structure.

So configured, it can be beneficial to dimension the compression member(s) 404 (e.g., neck 410, first and second ends 412, 414) to be as large as possible. In this manner, the compression member(s) 404 can contact physiological structure (e.g., the cervix) over a greater surface area and reduce the pressure exerted by the cervical-support system 10' on the physiological structure as compared to a compression member having smaller surface area.

Figure 17A:
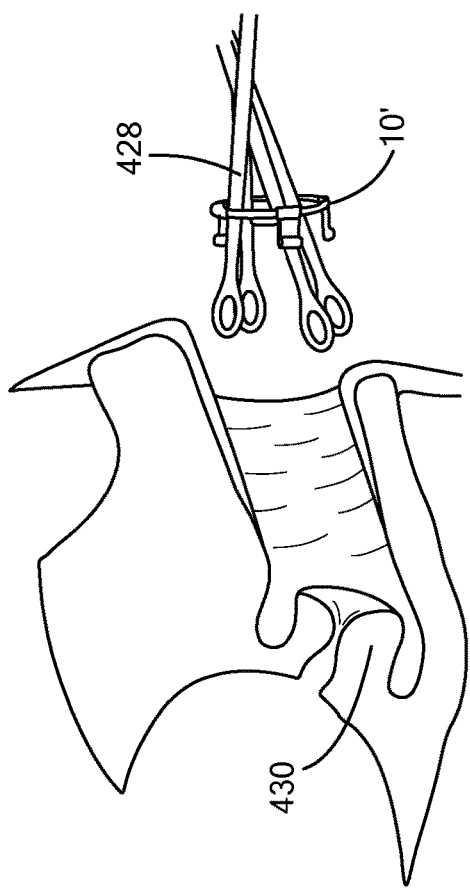
FIGS. 17A-D show a sequence of steps in a method for installing the cervix-support system of FIG. 15.
Figure 17B:
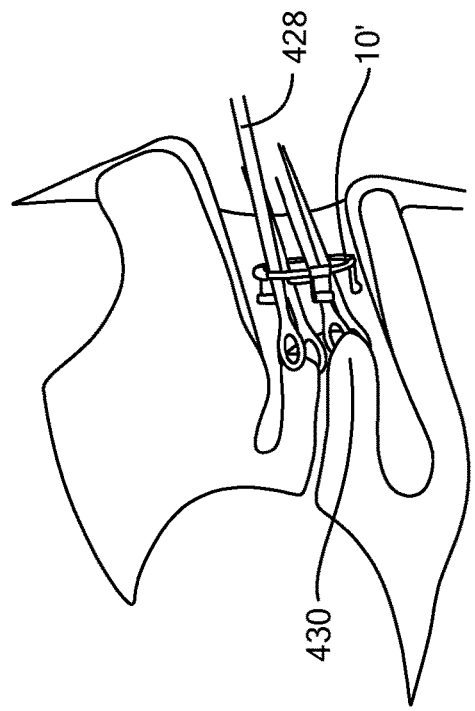
Figure 17C:
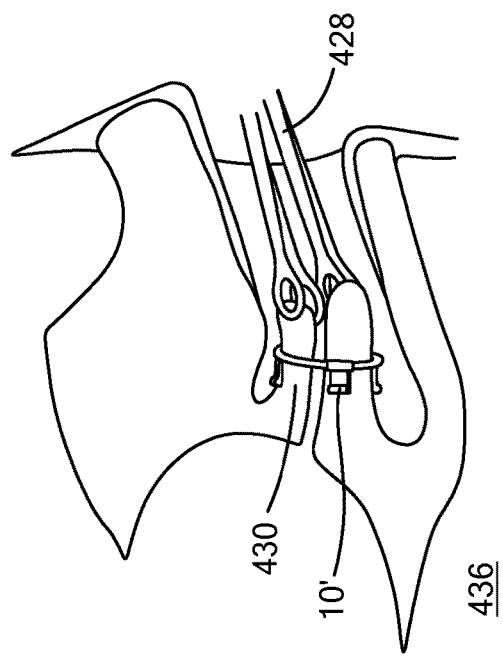
Figure 17D:
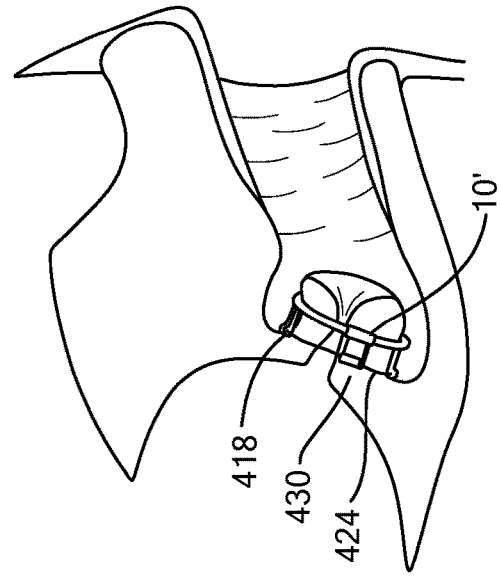

Referring now to FIGS. 17A-17D, a process of installing the embodiments of the cervical-support system (e.g., systems 10, 10') is illustrated. As shown, the process begins with placement of the cervical support system 10, 10' on a suitable delivery instrument, such as forceps 428, and advancing the delivery instrument and cervical support system 10, 10' together towards the physiological structure (e.g., cervix 430; FIG. 17A). After having engaged the cervix 430 with the delivery instrument, the delivery instrument, e.g., forceps 428, is pulled back to slightly distend the cervix 430 (FIG. 17B). The cervical support system 10, 10' is then slipped over the distended cervix 430 and the cervix 430 is released (FIG. 17C). With the cervical support system 10, 10' now in place, the suture 424 is inserted into the connecting features 418 of all the plates 404 and drawn tightly to provide cervical support (FIG. 17D).

While the foregoing embodiment shown in FIGS. 15-17D include significant advantages, other embodiments are possible.

Figure 18:
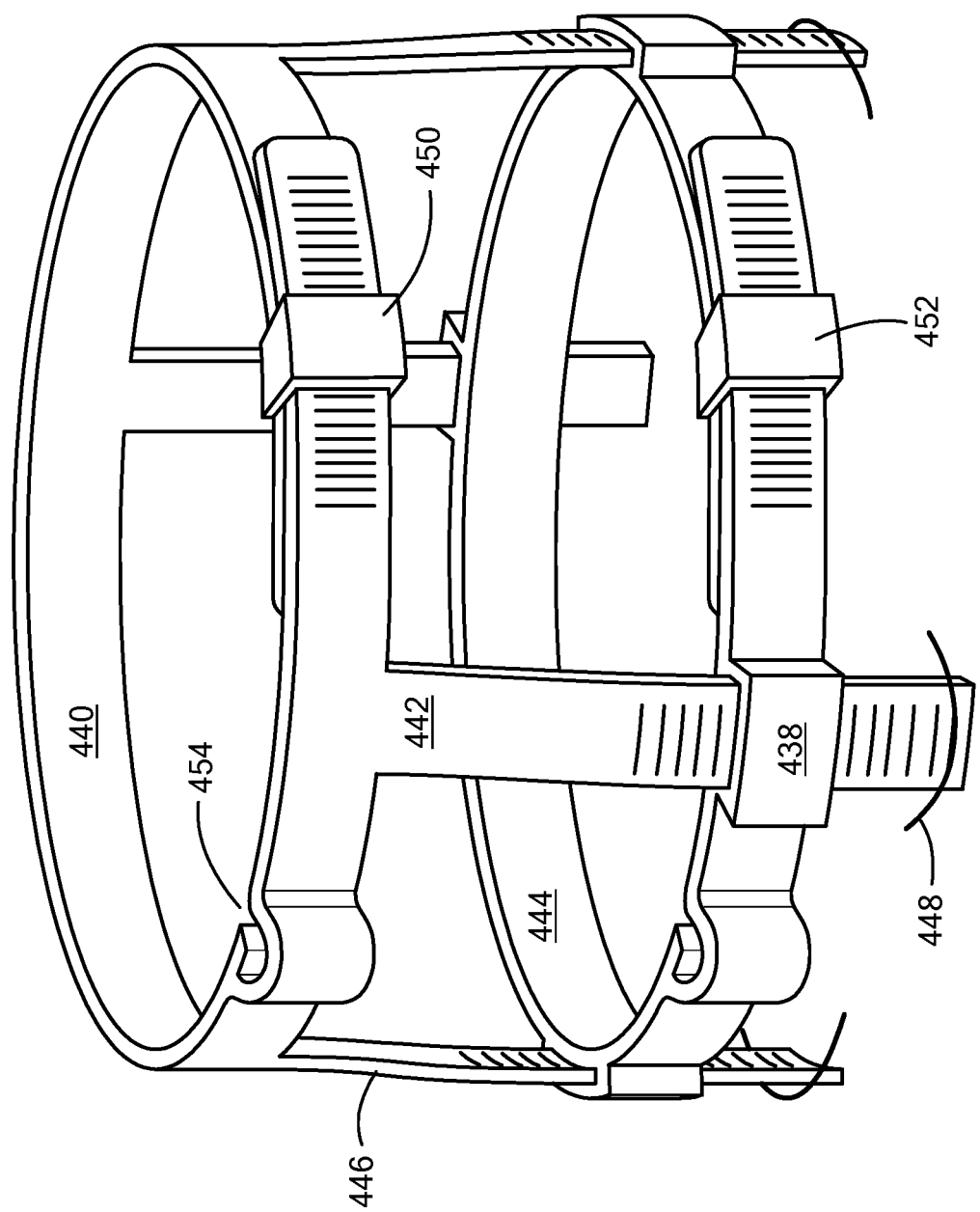
FIG. 18 shows an embodiment of a cervix-support system that relies on a lattice formed by circumferential and axial members.

In particular and as shown in FIG. 18, in one embodiment the cervical-support system 10 can adopt the form of cervical-support system 10". The cervical-support system 10" can include more than one flexible support structure. For example, system 10" can include parallel flexible support structures that are joined together by connector elements. As shown in FIG. 18, system 10" feature a first flexible support structure 440 connected to a second flexible support structure 444 by a plurality of stiffeners 442 (e.g., extending along an axial direction). The first flexible support structure 440 is configured to be seated at a predetermined location of the physiological structure. For example, in embodiments where the physiological structure is the cervix, the first flexible support structure 440 is configured to be seated in the junction between the cervix and the fornix.

The second flexible support structure 444 includes several anchors 438, each of which engages a corresponding one of the stiffeners 442, thus forming a lattice 446. The lattice 446 can be dimensioned to extend between predetermined portions of the patient's anatomy. For example, continuing the example where the physiological structure is the cervix, the lattice 446 can extend from a proximal portion of the cervix, near the fornix, to a distal portion of the cervix, which is remote from the fornix. The second flexible support structure 444 is tightened and then anchored into place on the cervix by sutures 448.

The first flexible support structure 440 includes compression ties 450 that are adjustable so as to reduce the diameter of the first flexible support structure 440, thereby applying a compressive pressure against the physiological structure (e.g., the cervix's proximal portion). Similarly, the second flexible support structure 444 includes compression ties 452 that are likewise adjustable so as to reduce diameter of the second flexible support structure 444, thereby applying a compressive pressure against the physiological structure (e.g., the cervix's distal portion). The stiffeners 442 provide additional compression along the length of the physiological structure. In addition, the stiffeners 442 exert a force that urges the first flexible support structure 440 to press into physiological structure (e.g., the junction of the cervix and the fornix, thereby promoting cervical lengthening).

For ease in removal without the need for special tools, the first flexible support structure 440 includes a quick release 454 that can easily be cut with standard cutting implements that are widely available.

Figure 19:
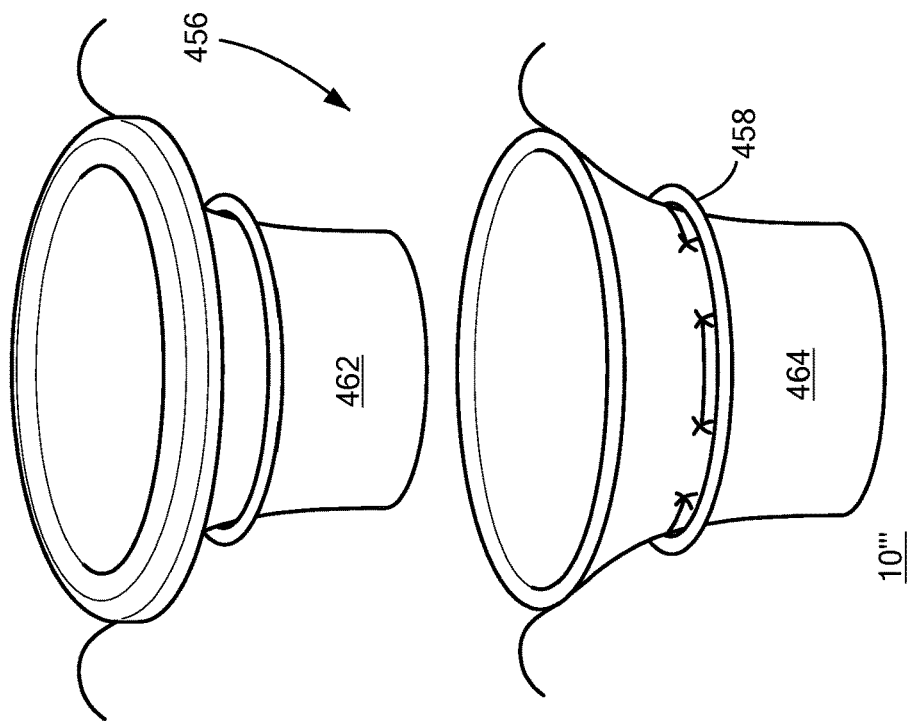
FIG. 19 shows another embodiment of a cervical support system of the present disclosure.

FIG. 19 shows another embodiment of the cervical-support system 10 in the form of cervical-support system 10′″. As shown, the cervical-support system 10′″ includes an elastic sleeve 456 and a cerclage 458 cooperate to provide radial compression to the physiological structure (e.g., cervix 460).

Embodiments of the sleeve 456 can be formed from a variety of materials. Examples can include, but are not limited to, biocompatible polymers (e.g., silicone). In further embodiments, the sleeve can be formed from elastomers.

The sleeve 456 includes a first sleeve-portion 462 and a second sleeve-portion 464. The cerclage 458 is carried out on the second sleeve-portion 464.

Figure 20B:
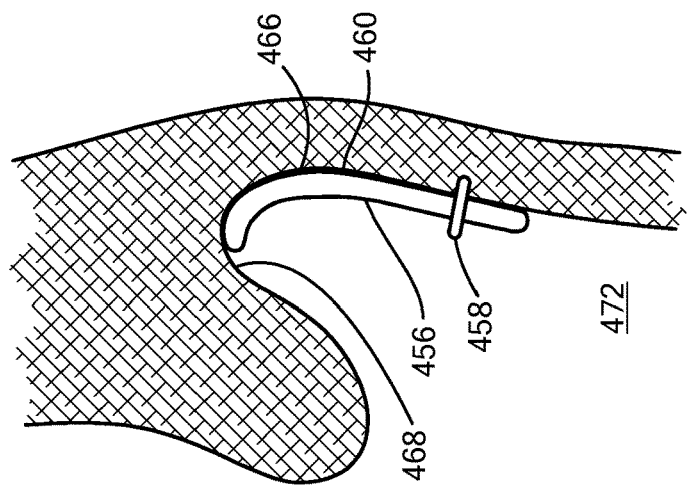
FIGS. 20A-20B illustrate placement of the cervical support system of FIG. 19 with respect to a physiological structure.
Figure 20A:
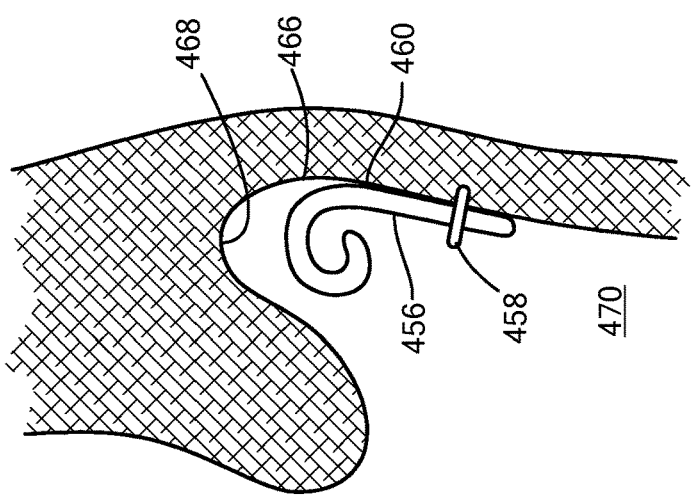

Referring now to FIGS. 20A-20B, the sleeve 456 is unrolled onto the physiological structure (e.g., cervix 460) to radially compress selected portions of the physiological structure (e.g., upper cervix up to its junction 466 with the fornix 468). This permits application of compression close to the junction 466. To promote fine tuning of pressure, some embodiments feature one or more bladders that are individually adjustable by inflation and deflation.

Approximating language, as used herein throughout the specification and claims, may be applied to modify any quantitative representation that could permissibly vary without resulting in a change in the basic function to which it is related. "Approximately," "substantially, or "about" can include numbers that fall within a range of 1%, or in some embodiments within a range of 5% of a number, or in some embodiments within a range of 10% of a number in either direction (greater than or less than the number) unless otherwise stated or otherwise evident from the context (except where such number would impermissibly exceed 100% of a possible value). Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the descriptions herein and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

It is to be understood that the foregoing description is intended to illustrate and not to limit the scope of the invention, which is defined by the scope of the appended claims. Other embodiments are within the scope of the following claims.

The invention claimed is:

1. A method, comprising:
encircling a cervix with a cervical support band having at least one flexible member having a generally annular configuration oriented in a radial plane and a plurality of compression members extending from the at least one flexible member such that the compression members extend in a plane generally perpendicular to the radial plane of the at least one flexible member and along a length of the cervix; and
passing a suture through cervical tissue and in engagement with selected ones of the compression members such that a compressive, radially-inward extending force is applied to the cervix along an entire length of each compression member, to support the cervix.

2. The method of claim 1, wherein the suture is passed into engagement with each compression member.

3. The method of claim 1, wherein the suture is passed into engagement with alternating compression members.

4. The method of claim 1, wherein the suture engages a groove in the compression members.

5. The method of claim 1, wherein at least one of the flexible member, the compression members, and the suture include a time release medication.

6. The method of claim 5, wherein the medication is progesterone.

7. The method of claim 1, wherein the cervical support band includes at least two compression members.

8. The method of claim 1, wherein the compression members are substantially equally spaced along a circumference of the flexible member.

* * * * *